United States Patent [19]

Mathews

[11] 4,251,764
[45] Feb. 17, 1981

[54] INTERFACE CIRCUIT FOR INTERCONNECTING AN ELECTRONIC CONTROLLER TO A RESISTANCE WELDING MACHINE

[75] Inventor: James K. Mathews, Van Nuys, Calif.

[73] Assignee: Pertron Controls Corporation, Canoga Park, Calif.

[21] Appl. No.: 33,453

[22] Filed: Apr. 26, 1979

[51] Int. Cl.³ .................................... H02H 7/127
[52] U.S. Cl. .................................. 323/320; 323/907; 219/494; 340/584
[58] Field of Search ............... 323/19, 20, 22 SC, 24, 323/40, 68–69; 361/103; 340/584, 588–589, 599; 219/487, 494, 499

[56] References Cited

U.S. PATENT DOCUMENTS

| | | | |
|---|---|---|---|
| 3,419,214 | 12/1968 | Evalds | 340/599 X |
| 3,564,293 | 2/1971 | Mungenast | 323/19 X |
| 4,021,701 | 5/1977 | Davies | 361/103 X |
| 4,039,928 | 8/1977 | Noftsker et al. | 323/22 SC |
| 4,052,744 | 10/1977 | Boothman et al. | 361/103 |
| 4,117,527 | 9/1978 | Demarest et al. | 323/68 X |

Primary Examiner—William M. Shoop
Assistant Examiner—Peter S. Wong
Attorney, Agent, or Firm—Keith D. Beecher

[57] ABSTRACT

An interface circuit is provided for interconnecting an electronic controller to a contactor circuit which, in turn, controls the alternating current flow from an alternating current power source to controlled equipment, such as a resistance welding machine. The contactor circuit, for example, includes a pair of semiconductor switching devices, such as silicon controlled rectifiers (SCR)s, the two semiconductor switching devices are alternately rendered conductive during successive half-cycles of the alternating current power from the alternating current power source at times controlled by the controller for the controlled operation of the welding machine. The interface circuit includes means for monitoring the junction temperature of each of the semiconductor switching devices, and to provide an indication and a control effect should the junction temperature exceed a particular safe threshold.

10 Claims, 2 Drawing Figures

INTERFACE CIRCUIT FOR INTERCONNECTING AN ELECTRONIC CONTROLLER TO A RESISTANCE WELDING MACHINE

BACKGROUND

The interface circuit of the present invention is of the same general type as described and claimed in U.S. Pat. No. 4,039,928, which is assigned to the present assignee. However, the circuit of the invention is simpler than the circuit described in the patent and is capable of improved operation with respect thereto, as will become apparent as the description proceeds.

As described in the patent, semiconductor switching devices, such as SCR's, are presently in widespread use for controlling the current flow to high current electrical loads, such as resistance welding machines, under the control of an appropriate electronic controller which supplies control commands to the gate electrodes of the semiconductor switching devices, thereby to control the amount of current flow to the controlled equipment. Such a controller is described, for example, in copending application Ser. No. 29,752 filed Apr. 13, 1979 in the name of the present inventor, and assigned to the present assignee. A resistance welding machine, as mentioned above, is one typical example of such a high current load with which semiconductor switching devices are used to control the current fed to the machine.

The power handling capability of semiconductor switching devices of the type mentioned above is limited due to self-heating. Should the junction temperature of such a device become excessive, it can be permanently destroyed. The system described in the patent is intended to monitor the junction temperature of the semiconductor switching devices to discontinue the current through the system should the temperature reach a predetermined threshold, and to initiate an appropriate warning, thereby preventing the temperature from reaching levels which could result in the destruction of the devices.

However, the circuitry disclosed in the patent is complex, and as mentioned above, an objective of the present invention is to provide a circuit which is much simpler than the circuit of the patent, and one which achieves the same result as the circuit of the patent in an improved manner. In a more specific sense, a further objective of the invention is to provide an improved and simplified control circuit for a resistance welding machine, for monitoring the junction temperatures of the semiconductor switching devices used in controlling the operation of the machine.

SUMMARY OF THE INVENTION

The circuit of the invention controls a contactor circuit which includes one or more semiconductor switching devices, such as silicon controlled rectifiers, each of which has its anode and cathode in series with a source of alternating current power and an electrical load, such as a resistance welding machine. The contactor circuit causes current to flow through the load only when the gate electrode of one or the other of the SCR's is forward biased, under the control of an electronic controller such as described in the copending application. The circuit of the invention is associated with each SCR, and it includes a resistance bridge amplifier having one arm formed by the gate-cathode resistance of the corresponding SCR. The gate-cathode resistance of the SCR is a measure of the junction temperature of the device, the resistance increasing as junction temperature increases. The bridge is originally balanced by means of a switch which, when actuated, short-circuits a portion of one of the resistance arms of the bridge, and the switch is then opened, so that during normal operation of the SCR, the bridge is unbalanced and a current flows in the output circuit of the bridge. However, should the junction temperature of the SCR rise to a particular selected threshold value, the gate-cathode resistance rises to a point at which the bridge becomes balanced, and the bridge output current drops to zero. This drop in output current is used in the system of the invention to provide an appropriate alarm, and also to provide a control effect to prevent any further firing of the SCR, until the junction temperature drops to its normal operating level.

DETAILED DESCRIPTION OF THE ILLUSTRATED EMBODIMENT

Figure 1:
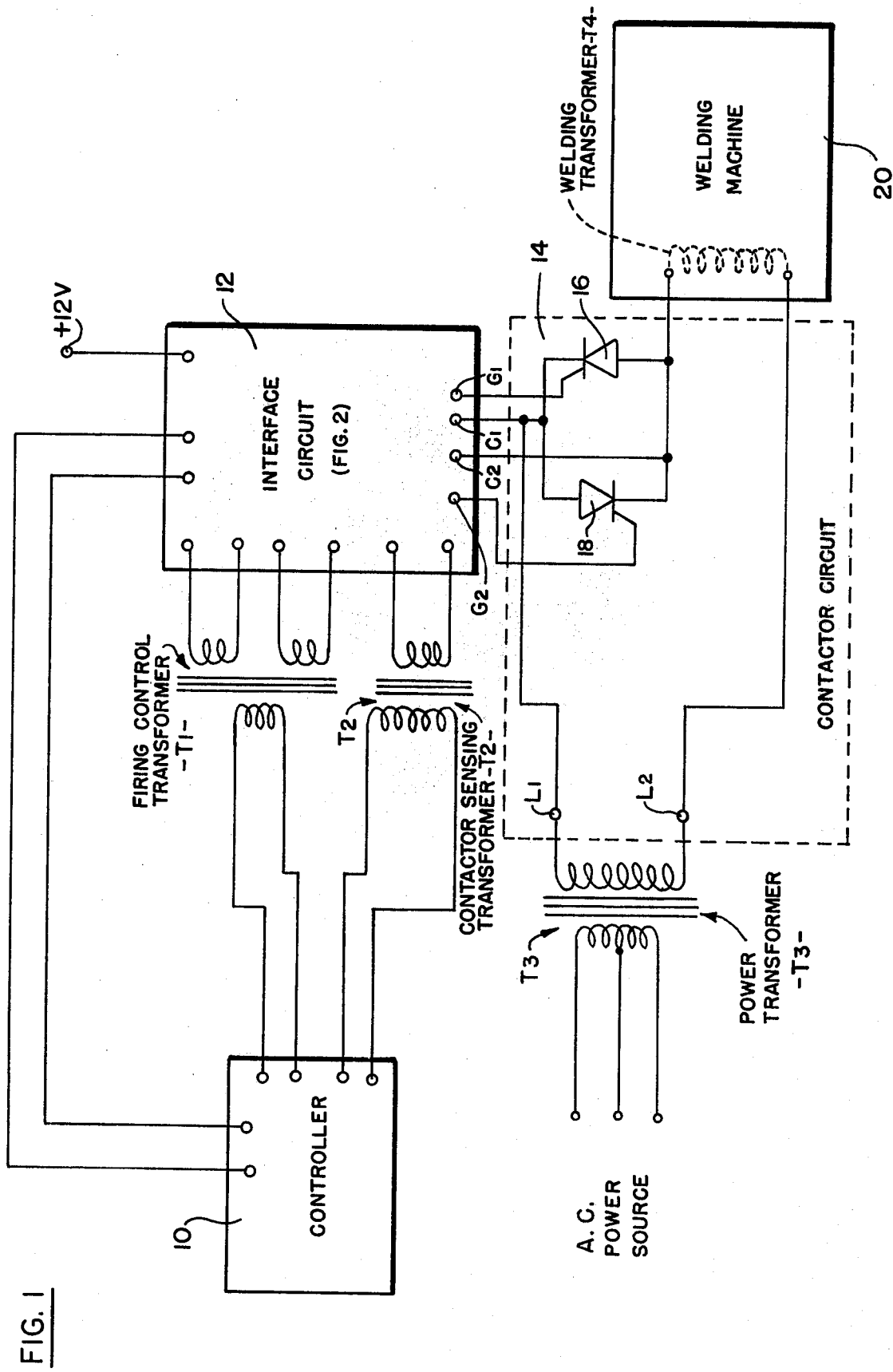
FIG. 1 is a diagram, partly in block form, and partly in circuit detail, showing a typical electronic controller for a resistance welding machine, and an interface circuit for coupling the controller to the contactor circuit of the welding machine.
Figure 2:
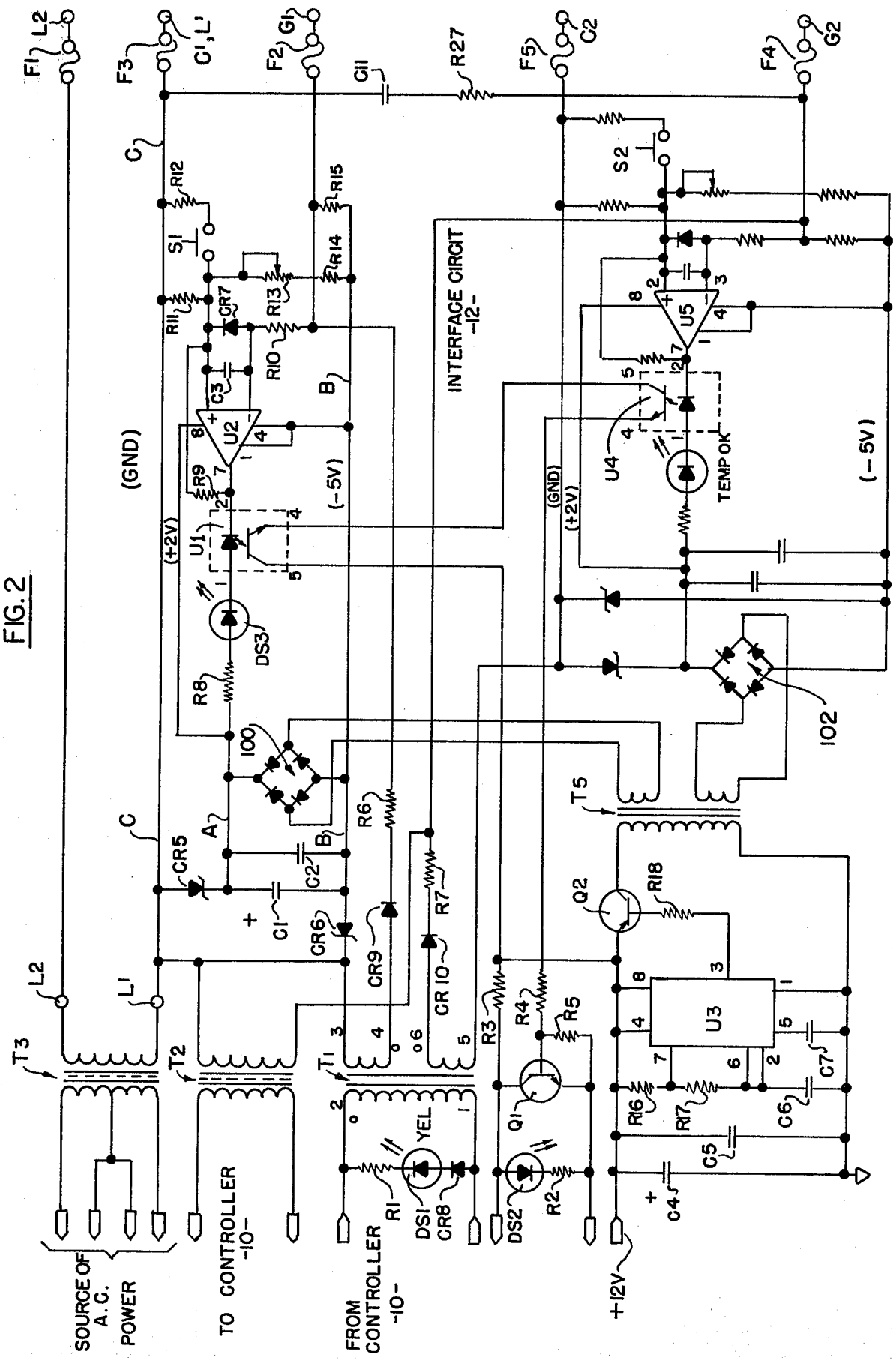
FIG. 2 is a circuit diagram of the interface circuit of FIG. 1, incorporating the concept of the present invention, in one of its embodiments.

In the system of FIG. 1, a controller 10 supplies firing pulses to a firing control transformer T1 as described in the copending application referred to above. The secondary windings of the transformer are connected to an interface circuit 12, which will be described in more detail in FIG. 2, and which includes a monitoring circuit for the junction temperature of the contactors in a contactor circuit, in accordance with the concepts of the present invention.

The interface circuit of FIG. 1 is also coupled back to controller 10 through a contactor sensing transformer T2. This latter transformer provides contactor monitoring signals to the controller which are used during a self-test operation, as described in the copending application, to monitor the semiconductor switching devices in the semiconductor switching devices circuit, so that any improper operation of the contactors may be readily determined.

The contactor circuit is designated 14 in FIG. 1, and it includes a pair of semiconductor switching devices 16 and 18 which, as mentioned above, may be SCR's. The gate electrode of SCR 16 is connected to a terminal designated G1 of the interface circuit, and the gate electrode of SCR 18 is connected to a terminal designated G2.

The secondary winding of a power transformer T3 has its two terminals designated respectively L1 and L2 connected respectively to the anode of SCR 18 and cathode of SCR 16, and to one side of a welding transformer T4 included in the controlled welding machine which is represented by the block 20. The cathode of SCR 18 and the anode of SCR 16 are connected to the other side of the winding of the welding transformer T4. Terminal C1 of interface circuit 12 is connected to the anode of SCR 18 and to the cathode of SCR 16. Terminal C2 of interface circuit 12 is connected to the cathode of SCR 18 and to the anode of SCR 16.

The interface circuit, as mentioned above, is shown in circuit detail in FIG. 2. The interface circuit includes an inverter circuit for transforming direct current power from a 12-volt source into alternating current power. The inverter includes an integrated circuit U3 of the type designated LM555. The integrated circuit U3 is connected as an oscillator. Specifically, pin 4 of the integrated circuit U3 is connected directly to the positive terminal of the 12-volt source, and pin 7 is connected through a 1 kilo-ohm resistor R16 to the positive terminal of that source. Pin 8 is also directly connected to the positive terminal. The negative terminal of the source is grounded. Pin 7 is connected to pins 2 and 6 through a 22 kilo-ohm resistor R17, and these latter pins are connected to a grounded 0.001 microfarad capacitor C6. A 6.8 microfarad capacitor C4 and a 0.1 microfarad capacitor C5 are connected between the positive source and ground.

Pin 1 of the integrated circuit U3 is grounded, and pin 5 is connected to a grounded 0.1 microfarad capacitor C7. Pins 4 and 8 are connected to the emitter of a PNP transistor Q2 which may be of the type designated MJE170. The base of the transistor is connected to pin 3 of integrated circuit U3 through a 330 ohm resistor R18. The primary of a transformer T5 is connected to the collector of transistor Q2 and to ground.

Transistor Q2 acts as a chopper in the inverter circuit, so that the +12 volt direct voltage may be transformed into alternating current voltages across the first and second secondary windings of transformer T5. The first secondary winding is connected to a full-wave rectifier 100, and the second secondary winding is connected to a full-wave rectifier 102. These full-wave rectifiers are floating. The two full-wave rectifiers 100 and 102 are included in identical circuits, one of which is used to trigger the SCR 16, and the other is used to trigger the SCR 18, so that only one of the circuits, specifically the circuit associated with full-wave rectifier 100, will be described in detail.

Full-wave rectifier 100 is connected between leads A and B, lead A being connected to a floating lead C through a Zener diode CR5. Zener diode CR5 may be rated at 2-volts, and may be of the type designated IN5221. The Zener diode serves as a regulator. A capacitor C2 of a value of 0.1 microfarads is connected between the leads A and B, and a second capacitor C1 of 6.8 microfarads is also connected between the leads. The full-wave rectifier 100 establishes, for example, −5 volts direct current on lead B, relative to the floating lead C. Lead C is connected through a 1 amp fuse F3 to the output terminal C1 of the interface circuit, and terminal L1 of the power transformer T3 is also connected thereto. The other side of power transformer T3 is connected to its terminal L2 through a 1 amp fuse F1.

The full-wave rectifier 100 establishes lead A at +2 volts with respect to floating lead C, as regulated by the Zener diode CR5. Lead A is connected through a 100 ohm resistor R8, and through a light emitting diode (LED) DS3 to an optical isolator U1. The LED DS3 may be of the type designated MV5253, and it may emit a green light when energized. This LED is used to indicate that the temperature of the junction of SCR 16 of FIG. 1 is below the critical threshold. Opto-isolator U1 may be of the type designated H11A1.

Pin 2 of opto-isolator U1 is connected to the output of an operational amplifier U2. Pins 1 and 4 of the operational amplifier are connected to the −5 volt lead B, and pin 8 is connected to the +2 volt lead A. The positive input of the operational amplifier U2 is connected through a 100 kilo-ohm resistor R9 to the output terminal, and through a 180 ohm resistor R11 to the floating lead C. A 0.1 microfarad capacitor C3 is connected between the positive and negative input of the operational amplifier, as is a diode CR7.

The operational amplifier U2 may be of the type designated LM311. The negative input of the operational amplifier is also connected through a 180 ohm resistor R10 and through a 1 amp fuse F2 to the G1 terminal of the interface circuit. The positive input of the operational amplifier is also connected to one side of a switch S1, the other side of the switch being connected to the floating ground lead C through a 430 ohm rezistor R12. The positive input of operational amplifier U2 is also connected to a 10 kilo-ohm potentiometer R13 which, in turn, is connected through a 2.2 kilo-ohm resistor R14 to the −5 volt lead B. Resistor R10 is also connected to lead B through a 1 kilo-ohm resistor R15.

As mentioned above, an identical circuit to that described above connects the full-wave rectifier 102 to the terminals C2 and G2 of the interface circuit for controlling the SCR 18.

The firing pulses from the controller 10 are introduced to the interface circuit through transformer T1. A first side of one of the secondary windings of the transformer is connected to the −5 volt lead B through a Zener diode CR6. The Zener diode may be of the type designated IN751A, and it has an operating voltage of 5-volts. The first side of the aforesaid secondary winding is also connected directly to one side of the primary winding of the contactor sensing transformer T2, and to the L1 terminal of power transformer T3. The other side of the first secondary winding is connected through a diode CR9, and through a current balancing resistor R6 to resistor R10. Resistors R6 and R10 are connected through a fuse F2 to output terminal G1. Resistor R6 may have a value of 10 ohms. Diode CR9 may be of the type designated IN5060.

The other secondary winding of transformer T1 has one side connected to the ground lead of the circuit associated with full-wave rectifier 102, and its other side is connected through a diode CR10 and a 10 ohm current balancing resistor R7 to the other side of the primary winding of transformer T2 and through a 1 amp fuse F4 to output terminal G2. Diode CR10 may be of the type designated IN5060. The ground lead of the circuit is connected through a 1 amp fuse F5 to the output terminal C2.

The opto-isolator U1 in the circuit associated with full-wave rectifier 100, and opto-isolator U4 in the circuit associated with full-wave rectifier 102, are connected in series, as shown, and through a pair of resistors R3 and R4 to the collector and base respectively of an NPN transistor Q1. Resistor R3 may have a value of 2.2 kilo-ohms, and resistor R4 may have a value of 10 kilo-ohms. The emitter and collector of transistor Q1 are connected back to the controller, to cause the controller to terminate introducing firing pulses to the transformer T1 whenever the transistor Q1 is rendered non-conductive, which indicates that an excessive temperature is being encountered in one of the SCR's 16 and 18. Resistor R4 is connected through a 1 kilo-ohm resistor R5 to the emitter of transistor Q1. The transistor may be of the type designated MJE100.

The primary winding of transformer T1 is shunted by a light emitting diode (LED) DS1, connected in series with a 68 ohm resistor R1 and a diode CR8. The LED may be of the type designated MV5353, and it may emit a yellow light whenever the controller is introducing firing pulses to the transformer T1, to indicate that the system is operating normally.

A light emitting diode (LED) DS2 is connected in series with a 330 ohm resistor R2 across transistor Q1. LED DS2 may be of the type designated MV5054, and it may emit red light in the event that the transistor Q1 is rendered non-conductive, to indicate that an over-temperature condition has been encountered in the junction of one of the SCR's 16 and 18.

Resistors R11, R12, R14, R15, R10, and potentiometer R13, together with the junction resistance of the SCR 16 form a bridge. At the outset, the switch S1 is closed, and the potentiometer R13 is adjusted to balance the bridge under normal operating conditions of the SCR 16, so that no current flows through the operational amplifier U2. Then, the switch S1 is opened, so that the bridge is unbalanced during normal operation, and current flows through the operational amplifier. Such current flow causes the LED DS3 to be illuminated, and to emit a green light, to indicate that the temperature of the SCR 16 is below the critical threshold. Now, should the junction temperature of the SCR rise to the critical temperature, the bridge will become balanced, and no current will flow through the operational amplifier U2. This will cause the LED DS3 to be de-energized, and the opto-isolator U1 will also cease to pass current, causing the transistor Q1 to become non-conductive. This, in turn, causes a signal to be transmitted to the controller, to cause the controller to stop introducing firing pulses to transformer T1. Also, LED DS2 illuminates, and emits red light, to warn the operator that an over-temperature condition has arisen.

The circuit associated with full-wave rectifier 102 performs the same function as the circuit described in the preceding paragraphs, should the junction temperature of the SCR's 18 reach the critical value.

It should be noted that as the controller 10 of FIG. 1 introduces timed firing pulses to the primary winding of transformer T1, and these firing pulses are introduced in an in-phase condition to the gates of both the SCR's 16 and 18. However, each time a pulse is introduced to the gates of the SCR's, the alternating current applied across the anode and cathode of the SCR's from the power transformer T3 is either in its positive half-cycle or of negative half-cycle, so that only one of the SCR's is actually fired for each pulse applied to the gate electrodes, and the SCR's fire on alternate half-cycles of the alternating current power from the transformer T3.

A 0.1 microfarad capacitor C11, and a 100 ohm resistor R27 are interconnected between the output terminals C and G2 to obviate any likelihood of both SCR's being fired at the same time.

Unlike the circuit disclosed in U.S. Pat. No. 4,039,928, the power to the SCR's 16 and 18 in the contactor circuit 14 of FIG. 1 is supplied independently of the control circuit by way of transformer T3, and the control circuit derives its own regulated direct current voltage to perform its monitoring function. Accordingly, the circuit of the present invention is extremely simple, as compared with the circuit of the patent, and it performs its monitoring function in a simpler and more efficient manner.

It will be appreciated that although a particular embodiment of the invention has been shown and described, modifications may be made. It is intended in the following claims to cover all modifications which come within the true spirit and scope of the invention.

What is claimed is:

1. A circuit for intercoupling a controller to a current consuming circuit, and which includes at least one semiconductor switching device having anode and cathode electrodes respectively connected to the current consuming circuit and to a source of power, said semiconductor switching device including a current-controlling electrode for controlling the flow of current through said device from said source to said current consuming circuit, said device exhibiting internal junction resistance between said cathode and current-controlling electrodes having a value related to the internal junction temperature of the device, said intercoupling circuit further including: circuitry intercoupling said controller to said current-controlling electrode of said semiconductor switching device to introduce timed firing pulses from the controller to said current-controlling electrode; a bridge network connected to said current-controlling and cathode electrodes of said semiconductor switching device such that said junction resistance of said device forms a part of said bridge network; power supply means connected to said bridge network for supplying an exciting potential thereto; and an output circuit connected to said bridge network to detect when said junction resistance of said semiconductor switching device reaches a predetermined threshold.

2. The combination defined in claim 1, and which includes manually-operated switching means connected to said bridge network to permit said bridge network to be balanced during normal operation of the semiconductor switching device when said switching means is closed, and to be unbalanced during such normal operation when the switching means is open.

3. The combination defined in claim 2, and which includes manually variable potentiometer means included in said bridge network to permit the bridge network to be balanced when the switching means is closed.

4. The combination defined in claim 1, in which said power supply means includes a full-wave rectifier connected across said bridge network to apply a direct current voltage across the bridge network.

5. The combination defined in claim 4, in which said power supply means includes a direct current-alternating current inverter circuit connected to said full-wave rectifier.

6. The combination defined in claim 1, in which said output circuit includes electrically energized means for indicating when the temperature of the junction of the semiconductor switching device is below a critical threshold.

7. The combination defined in claim 1, in which said output circuit includes circuit means for introducing a control signal to said controller when the junction temperature of the semiconductor switching device exceeds a critical threshold so as to cause the controller to interrupt the application of the firing pulses to the intercoupling circuitry.

8. The combination defined in claim 7, and which includes opto-isolator means coupling said last-named circuit means to said output circuit.

9. The combination defined in claim 1, in which said output circuit includes electrically energized means for indicating when the temperature of the junction of the semiconductor switching device is above a critical threshold.

10. The combination defined in claim 7, in which said last-named circuit means includes electrically energized means for indicating when the junction of the semiconductor switching device is above a critical threshold.

* * * * *